(12) United States Patent
Krishnamoorthy et al.

(10) Patent No.: US 8,742,735 B2
(45) Date of Patent: Jun. 3, 2014

(54) HIGH-VOLTAGE STARTUP CIRCUIT (75) Inventors: Ravishanker Krishnamoorthy, Singapore (SG); Radu Pitigoi-Aron, San Jose, CA (US); Siew Yong Chui, Singapore (SG)

(73) Assignee: Marvell World Trade Ltd., St. Michael (BB)

( * ) Notice: Subject to any disclaimer, the term of this patent is extended or adjusted under 35 U.S.C. 154(b) by 202 days.

(21) Appl. No.: 13/449,407

(22) Filed: Apr. 18, 2012

(65) Prior Publication Data
US 2012/0294051 A1 Nov. 22, 2012

Related U.S. Application Data (60) Provisional application No. 61/486,488, filed on May 16, 2011, provisional application No. 61/494,619, filed on Jun. 8, 2011.

(51) Int. Cl.
*G05F 1/10* (2006.01)

(52) U.S. Cl.
USPC .......................................... 323/222; 315/247

(58) Field of Classification Search
USPC ............ 363/16, 39, 41, 46, 21, 6, 49, 89, 97; 315/224, 247, 219, 307, 308, 291; 323/207, 209, 282–288
See application file for complete search history.

(56) References Cited

U.S. PATENT DOCUMENTS

| | | | |
|---|---|---|---|
| 4,072,890 A | 2/1978 | Westbrook et al. | |
| 4,553,082 A | 11/1985 | Nesler | |
| 4,859,921 A | 8/1989 | Archer | |
| 5,039,931 A * | 8/1991 | Wieland | 320/104 |
| 5,359,281 A | 10/1994 | Barrow et al. | |
| 5,360,962 A * | 11/1994 | Pettit | 219/497 |
| 5,546,043 A | 8/1996 | Pollmeier | |
| 5,559,395 A | 9/1996 | Venkitasubrahmanian et al. | |
| 5,712,774 A | 1/1998 | Uramoto | |
| 5,798,635 A * | 8/1998 | Hwang et al. | 323/222 |
| 5,869,935 A * | 2/1999 | Sodhi | 315/225 |
| 6,229,681 B1 | 5/2001 | Lee | |
| 6,369,109 B1 | 4/2002 | Debatin et al. | |
| 6,448,713 B1 * | 9/2002 | Farkas et al. | 315/291 |

(Continued)

FOREIGN PATENT DOCUMENTS

DE    3304759 A1    8/1984

OTHER PUBLICATIONS

PCT International Search Report for Application No. PCT/US2012/037466; Jun. 20, 2013; 4 pages.

(Continued)

*Primary Examiner* — Rajnikant Patel (57) ABSTRACT

A system including a power transistor configured to receive an alternating current (AC) line voltage and a control circuit. During a rising portion of a half cycle of the AC line voltage, the control circuit is configured to turn on the power transistor when the AC line voltage reaches a first value and turn off the power transistor when the AC line voltage reaches a second value. The second value is greater than the first value. During a falling portion of the half cycle, the control circuit is configured to turn on the power transistor when the AC line voltage reaches the second value and turn off the power transistor when the AC line voltage reaches the first value.

20 Claims, 5 Drawing Sheets

(56) References Cited

U.S. PATENT DOCUMENTS

| | | |
|---|---|---|
| 7,609,036 B2 | 10/2009 | Bartolo et al. |
| 2003/0057871 A1 | 3/2003 | Kominami et al. |
| 2006/0034109 A1 | 2/2006 | Benabdelaziz et al. |
| 2006/0062026 A1 | 3/2006 | Wittenbreder |
| 2007/0274104 A1 | 11/2007 | Furukoshi et al. |
| 2009/0230870 A1 | 9/2009 | Quazi |
| 2011/0042726 A1 | 2/2011 | Banerjee et al. |

OTHER PUBLICATIONS

PCT International Search Report for Application No. PCT/US2012/037460; Aug. 7, 2012; 5 pages.

PCT International Search Report for Application No. PCT/IB10/03465; Aug. 14, 2011; 2 pages.

* cited by examiner

HIGH-VOLTAGE STARTUP CIRCUIT

CROSS-REFERENCE TO RELATED APPLICATIONS

This application claims the benefit of U.S. Provisional Application No. 61/486,488, filed on May 16, 2011.

This application is related to U.S. Provisional Application no. 61/494,619, filed on Jun. 8, 2011.

The disclosures of the above applications are incorporated herein by reference in their entirety.

FIELD

The present disclosure relates to a high-voltage startup circuit for systems that require DC power to operate when power is initially turned on.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Figure 1:
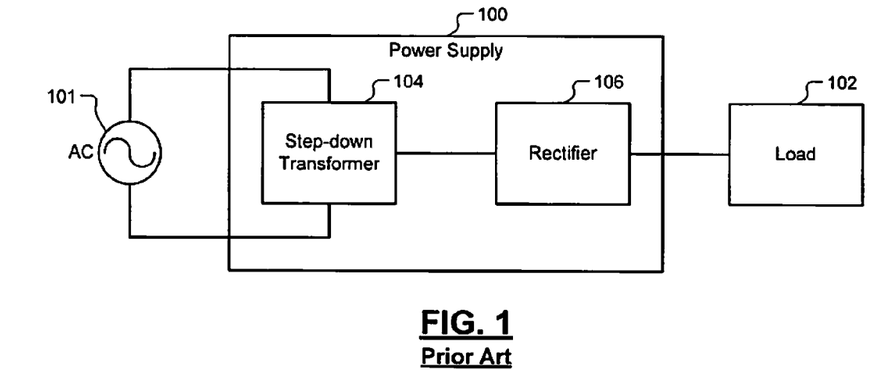
FIG. 1 is a functional block diagram of a power supply that rectifies a stepped-down alternating current (AC) line voltage according to the prior art.

Referring now to FIG. 1, a power supply 100 converts an alternating current (AC) line voltage 101 to one or more direct current (DC) voltages that are suitable for a load 102. The AC line voltage 101 may be 110V, 60 Hz or 220V, 50 Hz. The DC voltages may include a fraction of 1V, 1.5V, ±5V, ±12V, 24V, or any other suitable value to drive the load 102. The power supply 100 includes a step-down transformer 104 and a rectifier 106. The step-down transformer 104 converts the AC line voltage 101 to an AC voltage having a smaller value than the AC line voltage 101 (e.g., 24V AC, 12V AC, and so on) depending on the value of the DC voltage to be generated. The rectifier 106 converts the AC voltage output by the step-down transformer 104 to the DC voltage and outputs the DC voltage to the load 102.

Figure 2:
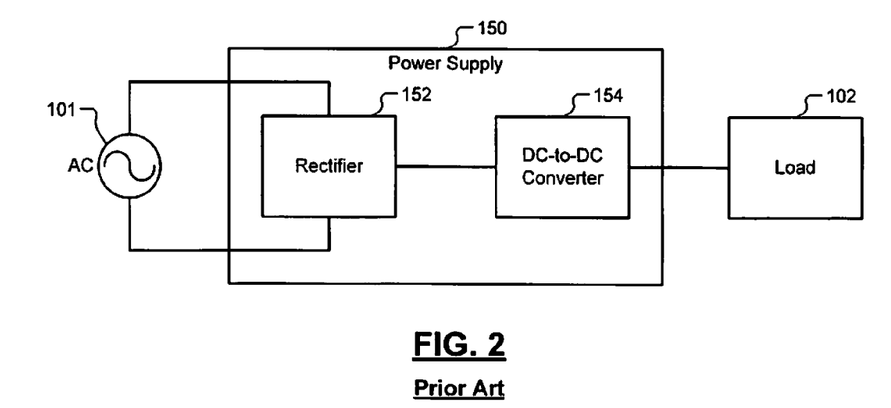
FIG. 2 is a functional block diagram of a power supply that rectifies the AC line voltage and generates one or more DC voltages according to the prior art.

Referring now to FIG. 2, a power supply 150 converts the AC line voltage 101 to one or more DC voltages that are suitable for the load 102. The power supply 150 includes a rectifier 152 and a DC-to-DC converter 154. The rectifier 152 converts the AC line voltage 101 to a DC voltage. The DC-to-DC converter 154 converts the DC voltage output by the rectifier 152 to the one or more DC voltages that are suitable for operating the load 102.

The DC-to-DC converter 154 typically includes a switching controller (e.g., a pulse width modulation (PWM) controller). The switching controller requires a DC voltage for operation. The DC voltage required to operate the switching controller at startup (i.e., when power is turned on) is typically generated using a resistor. The resistor drops the AC line voltage 101 to a low value, which is used to power the switching controller at startup. Subsequently, when the DC voltages to operate the load 102 are generated, the switching controller is operated using one of the DC voltages.

An efficiency of a power supply is given by a ratio of an output voltage of the power supply to an input voltage of the power supply. The efficiency of the power supply 150 is very low. For example, if the value of the DC voltage supplied by the power supply 150 to the load 102 is 5V, and the value of the AC line voltage 101, is 120V (i.e., approximately 170V RMS), then the efficiency of the power supply 150 is 5/170=approximately 3%. If the DC voltage supplied to the load 102 is 12V, and the AC line voltage 101 is 220V (i.e., approximately 311V RMS), then the efficiency of the power supply 150 is 12/311=approximately 4%.

Additionally, the resistor used to power the switching controller at startup dissipates power. Further, in some applications, the power supply 150 continues to operate and therefore dissipates power although the load 102 may be switched from a normal operating mode to a power-save mode.

SUMMARY

A system comprises a power transistor configured to receive an alternating current (AC) line voltage and a control circuit. During a rising portion of a half cycle of the AC line voltage, the control circuit is configured to turn on the power transistor when the AC line voltage reaches a first value and turn off the power transistor when the AC line voltage reaches a second value. The second value is greater than the first value. During a falling portion of the half cycle, the control circuit is configured to turn on the power transistor when the AC line voltage reaches the second value and turn off the power transistor when the AC line voltage reaches the first value.

In other features, the system further comprises a capacitance, where the power transistor charges the capacitance when the power transistor is turned on, and where the capacitance outputs a voltage having a value less than the first value.

In other features, the control circuit is configured to turn off the power transistor when the voltage output by the capacitance is greater than or equal to the first value.

In other features, the system further comprises a power supply configured to generate a direct current (DC) voltage based on the AC line voltage and a controller configured to control the power supply. The voltage output by the capacitance powers the controller.

In other features, the control circuit is configured to disable the power transistor.

In still other features, a system comprises a power transistor configured to receive an alternating current (AC) line voltage and charge a capacitance to an output voltage based on when the power transistor is turned on during a half cycle of the AC line voltage. The system further comprises a control circuit configured to turn on the power transistor to charge the capacitance when the AC line voltage is between a first value and a second value during a half cycle of the AC line voltage, where the first value is greater than or equal to the output voltage, and where the second value is greater than the first value by a predetermined amount. The control circuit is further configured to turn off the power transistor when the AC line voltage is not between the first value and the second value during the half cycle of the AC line voltage or when the capacitance is charged to the output voltage.

In other features, the system further comprises a controller configured to control a power supply, where the power supply generates a direct current (DC) voltage based on the AC line voltage, and where the capacitance outputs the output voltage to the controller.

In other features, the control circuit is configured to turn off the power transistor and components of the control circuit.

In other features, the control circuit comprises a voltage divider configured to divide the AC line voltage, a comparator configured to compare an output of the voltage divider to a reference voltage, and a switch configured to, based on the comparison, turn on the power transistor when the AC line voltage is between the first value and the second value, and to turn off the power transistor when the AC line voltage is not between the first value and the second value.

In other features, the control circuit comprises a voltage divider configured to divide the output voltage, a comparator configured to compare an output of the voltage divider to a reference voltage, and a switch configured to, based on the comparison, turn on the power transistor when the AC line voltage is between the first value and the second value and when the capacitance is charged to less than the output voltage, and to turn off the power transistor when the capacitance is charged to greater than or equal to the output voltage.

In still other features, an integrated circuit (IC) comprises a first resistance having a first end connected to an alternating current (AC) line voltage, and a second end; and a second resistance having a first end connected to the second end of the first resistance, and a second end. The system further comprises a first comparator having a first input connected to the second end of the first resistance, a second input connected to a reference voltage, and a first output. The system further comprises a first transistor having a gate connected to the first output of the first comparator, a source connected to the second end of the second resistance, and a drain; and a second transistor having a source connected to the second end of the second resistance, a drain connected to the drain of the first transistor, and a gate. The system further comprises a second comparator having a second output connected to the gate of the second transistor, a first input connected to the reference voltage, and a second input. The system further comprises a third resistance having a first end connected to the second end of the second resistance and a second end connected to the second input of the second comparator; and a fourth resistance having a first end connected to the second input of the second comparator and a second end. The system further comprises a fifth resistance having a first end connected to the second end of the fourth resistance and a second end connected to the drain of the first transistor. The system further comprises a diode having a cathode connected to the first end of the fifth resistance and an anode. The system further comprises a third transistor having a source connected to the anode of the diode, a drain connected to the first end of the first resistance, and a control terminal connected to the drain of the second transistor. The system further comprises a capacitance having a first end connected to the cathode of the diode and a second end connected to the second end of the second resistance.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

The present disclosure relates to a startup circuit that supplies power at startup (i.e., when power is turned on) to a system that draws power from AC line voltage (e.g., 120V AC) and that requires power (e.g., 5V DC) to operate at startup. For example, the startup circuit provides power to a switching controller of a power supply at startup. Based on the power provided by the startup circuit, the switching controller can control the operation of the power supply at startup so that the power supply can generate one or more DC voltages from the AC line voltage to operate a load.

After the power supply generates the DC voltages, one of the DC voltages can be used to power the switching controller. Based on the DC voltage generated by the power supply, the switching controller continues operation and controls the power supply. The startup circuit can be disabled after the DC voltage generated by the power supply is used to power the switching controller. The principles of the present disclosure, while described using a power supply as an example, can be applied to any system that draws power from the AC line voltage and that requires power such as 5V DC to operate at startup.

Figure 3A:
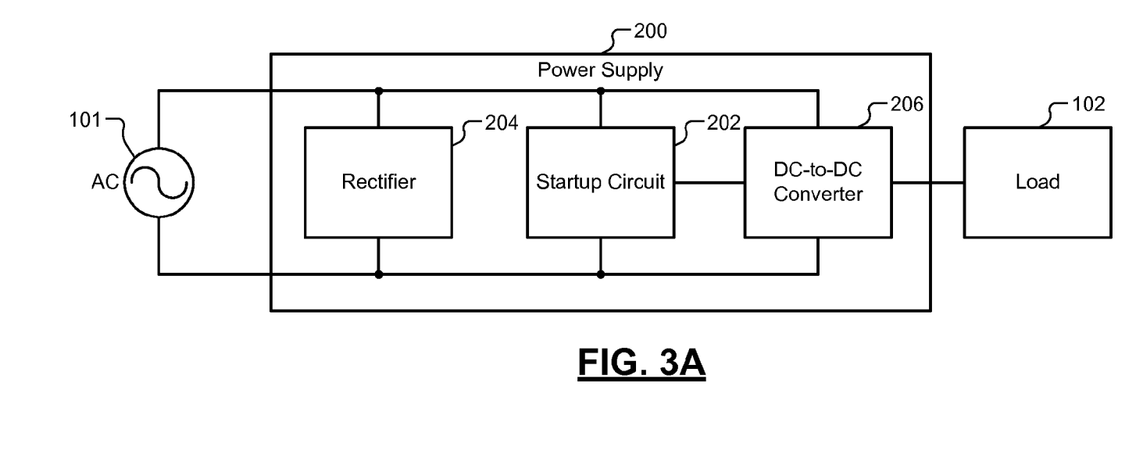
FIGS. 3A and 3B are functional block diagrams of a power supply including a startup circuit according to the present disclosure.
Figure 3B:
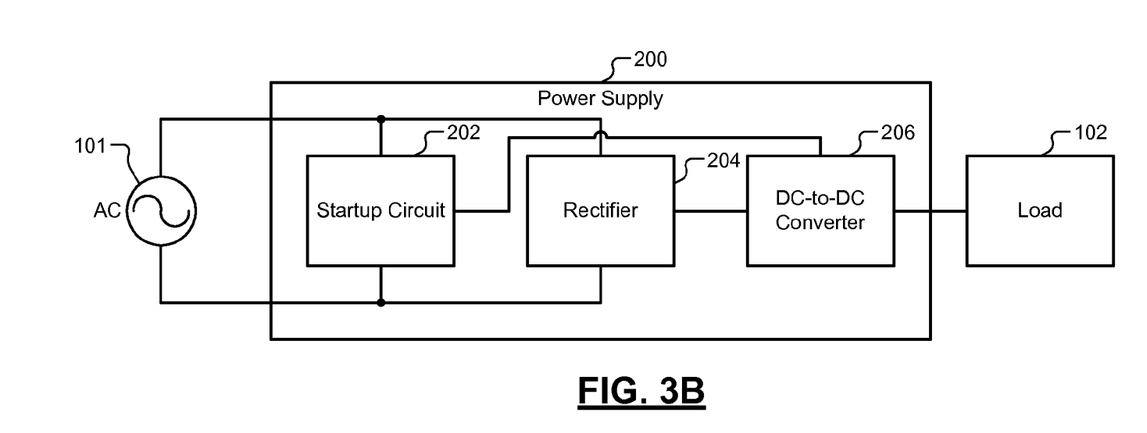

Referring now to FIGS. 3A and 3B, a power supply 200 comprising a startup circuit 202 according to the present disclosure is shown. In FIG. 3A, the startup circuit 202 is arranged between a rectifier 204 and a DC-to-DC converter 206. In FIG. 3B, the startup circuit 202 is arranged between the AC line voltage 101 and the rectifier 204. In either arrangement, the startup circuit 202 draws power from the AC line voltage 101 during startup and supplies a DC voltage suitable for operating components (e.g., a switching controller) of the DC-to-DC converter 206. The DC-to-DC converter 206 generates one or more DC voltages suitable for operating the load 102. After the DC voltages are generated, the DC-to-DC converter 206 uses one of the DC voltages to operate components such as the switching controller of the DC-to-DC converter 206 and disables the startup circuit 202.

Figure 4A:
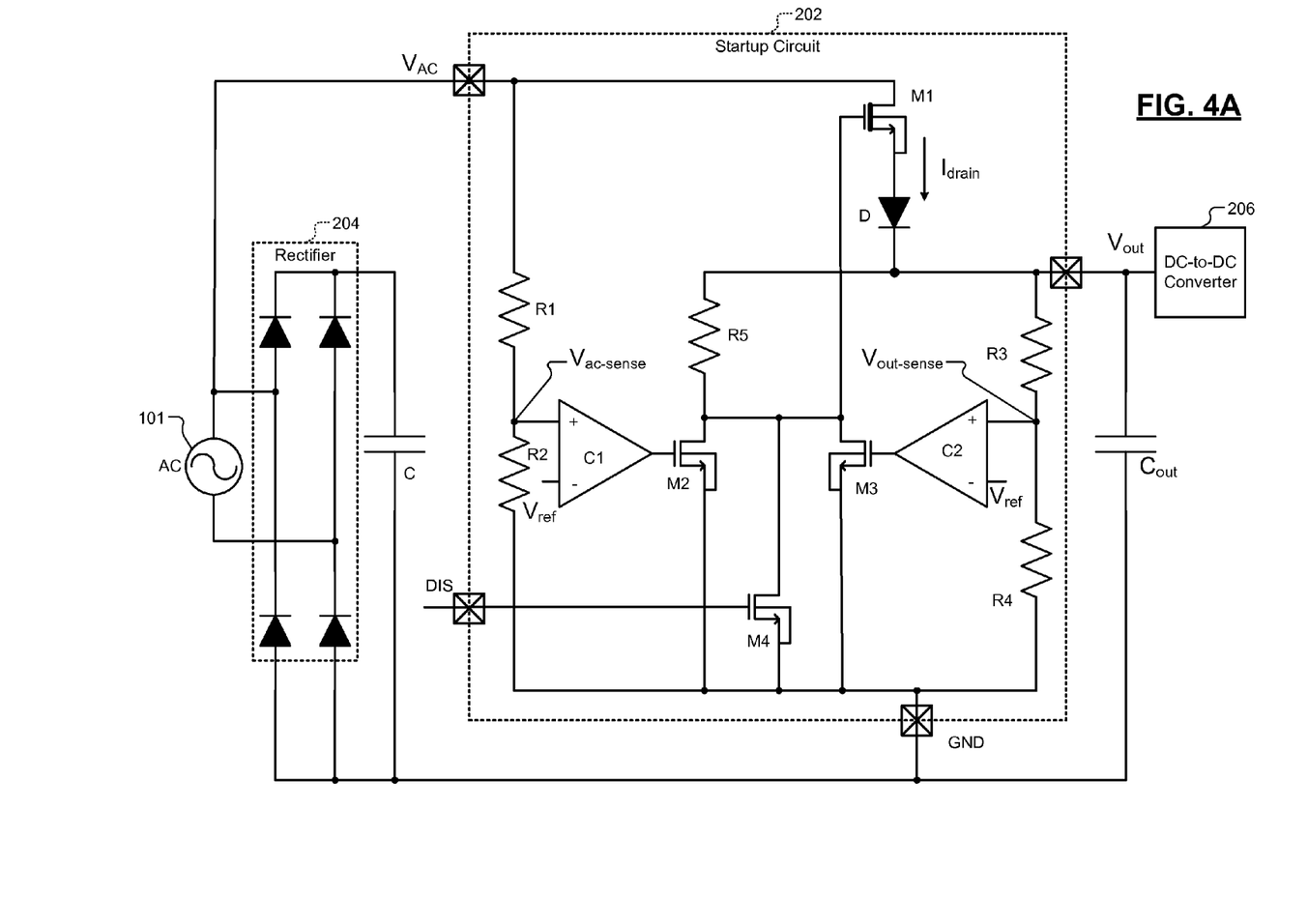
FIG. 4A is a schematic of the startup circuit.
Figure 4B:
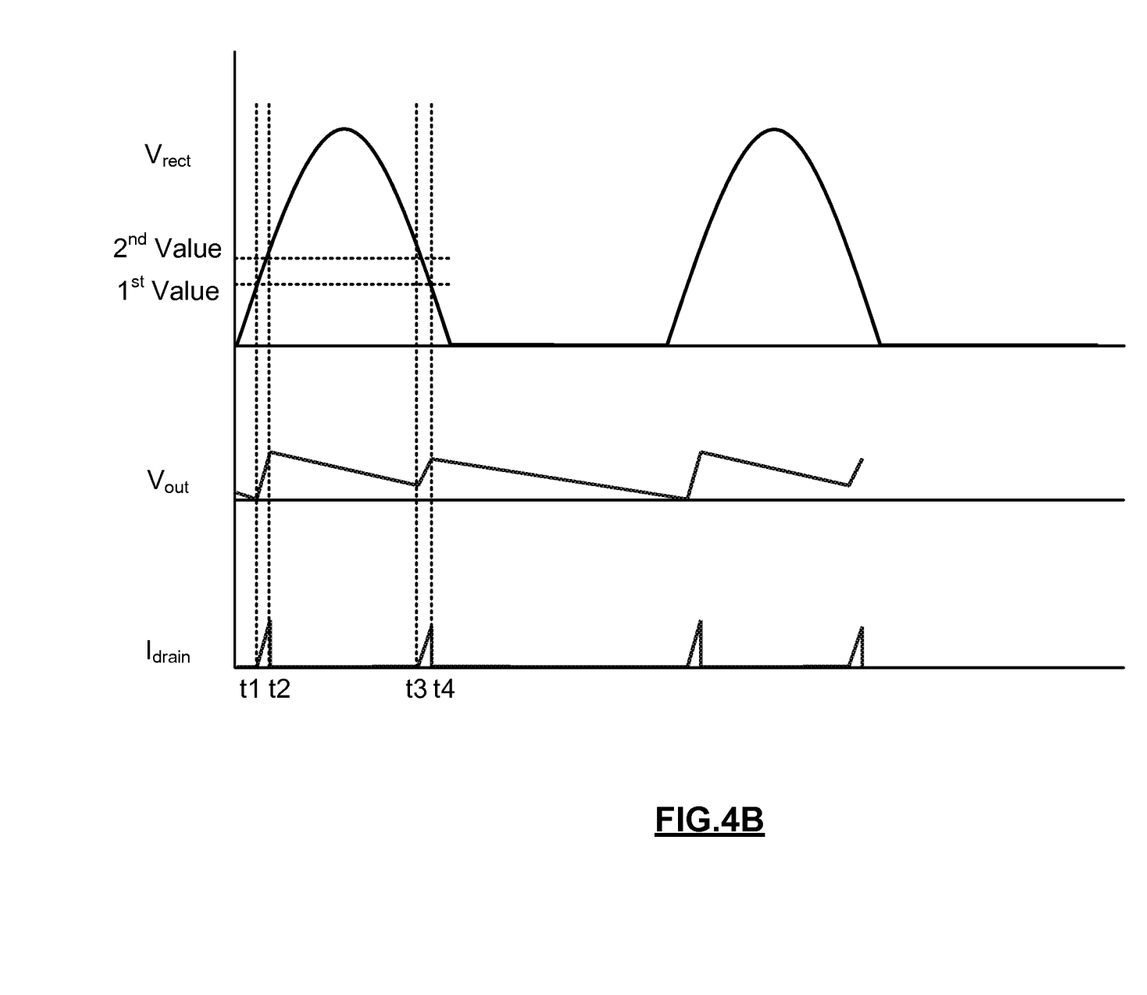
FIG. 4B is a graph depicting the AC line voltage, an output voltage of the startup circuit, and a drain current supplied by the startup circuit as a function of time.

Referring now to FIGS. 4A and 4B, the startup circuit 202 is shown in detail. In FIG. 4A, the startup circuit 202 charges a capacitor $C_{out}$ during each half-cycle of the AC line voltage at startup. The startup circuit 202 charges the capacitor $C_{out}$ to an output voltage $V_{out}$. The capacitor $C_{out}$ supplies the output voltage $V_{out}$ to a component such as a switching controller (not shown) of the DC-to-DC converter 206 at startup. For example only, suppose that the switching controller requires 5V DC to operate. The startup circuit 202 charges the capacitor $C_{out}$ to 5V DC and supplies 5V DC to the switching controller at startup.

The startup circuit 202 charges the capacitor $C_{out}$ when the value of the AC line voltage is between a first value and a second value during each half cycle of the AC line voltage. The first value is selected based on the value of the output voltage $V_{out}$. The second value is greater than the first value. For example, if $V_{out}=5V$, the first value may be any value greater than 5V. For example only, suppose that the first value is 5.1V. The second value may be 6V, 7V, 8V, or any value greater than the first value. For example only, suppose that the second value is 6V.

In FIG. 4B, the startup circuit 202 begins charging the capacitor $C_{out}$ at time t1 during a half cycle of the AC line voltage when the AC line voltage increases from zero to a first value greater than 5V RMS (e.g., 5.1V RMS). The startup circuit 202 charges the capacitor $C_{out}$ until time t2 when the AC line voltage increases to a second value greater than the first value (e.g., 6V RMS). The startup circuit 202 stops charging the capacitor $C_{out}$ at time t2 when the AC line voltage is greater than or equal to the second value (e.g., 6V RMS).

Subsequently, the AC line voltage increases to a peak value (e.g., 1.44*110V) and begins to decrease. The startup circuit 202 again begins charging the capacitor $C_{out}$ at time t3 when the AC line voltage decreases from the peak value to the second value (e.g., 6V RMS). The startup circuit 202 charges the capacitor $C_{out}$ until time t4 when the AC line voltage decreases from the second value to the first value (e.g., from 6V RMS to 5.1V RMS). The startup circuit 202 stops charging the capacitor $C_{out}$ at time t4 when the AC line voltage is less than or equal to the first value (e.g., 5.1V RMS). The AC line voltage then returns to zero, and the cycle is repeated according to a line frequency of the AC line voltage (e.g., 50 Hz). The capacitor $C_{out}$ outputs the output voltage $V_{out}$=5V to the switching controller.

Based on the output voltage $V_{out}$ supplied by the startup circuit 202, the switching controller of the DC-to-DC converter 206 operates during startup, and the DC-to-DC converter 206 generates one or more DC voltages to operate the load 102. Subsequently, one of the DC voltages generated by the DC-to-DC converter 206 (e.g., 5V) is used to power the switching controller, and the startup circuit 202 can be disabled.

In the above example, the capacitor $C_{out}$ is charged when the input voltage to the startup circuit 202 is between 5V RMS and 6V RMS. Since the maximum input voltage to the startup circuit 202 is 6V RMS, and the output voltage of the startup circuit 202 is 5V, the worst-case efficiency of the startup circuit 202 is 5/6=approximately 83%. The startup circuit 202 is now described in detail.

In FIG. 4A, the startup circuit 202 can be manufactured as an integrated circuit (IC) having four pins: $V_{AC}$, $V_{out}$, disable (DIS), and ground (GND). The $V_{AC}$ pin is connected to the AC line voltage 101. The $V_{out}$ pin is connected to the output capacitor $C_{out}$ and supplies the output voltage $V_{out}$ generated by the startup circuit 202 to the DC-to-DC converter 206 at startup. The GND pin is connected to ground. The DIS pin can be used to input a disable signal to turn off the startup circuit 202 after the startup (i.e., after the DC-to-DC converter 206 generates the one or more DC voltages) to save power. For example, the DC-to-DC converter 206 may send a control signal to the DIS pin after the DC-to-DC converter 206 generates the one or more DC voltages. The control signal turns off the startup circuit 202. Alternatively, the DIS pin can be connected to ground when unused.

The startup circuit 202 includes a super-high voltage, depletion-mode power transistor M1 that is controlled by comparators C1 and C2; transistors M2, M3, and M4; and resistors R1 through R5. The comparators C1 and C2; transistors M2, M3, and M4; and resistors R1 through R5 may be called a control circuit that controls the power transistor M1. The transistors M2, M3, and M4 may be CMOSFETs. The resistors R1 and R2 are high-voltage resistors.

A gate voltage of the power transistor M1 is determined by the resistor R5 and the transistors M2, M3, and M4. The transistors M2, M3, and M4 are controlled by the AC line voltage $V_{AC}$, the output voltage $V_{out}$, and the disable input (DIS), respectively. The resistor R5 is used to charge the gate voltage of the power transistor M1 to $V_{out}$. A diode D is a reverse blocking diode that prevents the output voltage $V_{out}$ from discharging through a body diode of the power transistor M1.

When power is turned on (i.e., at startup), $V_{out}$ is initially low; the transistors M2, M3, and M4 are turned off; and the gate voltage of the power transistor M1 is equal to $V_{out}$. Since the power transistor M1 is a depletion mode MOSFET, the threshold voltage is negative, and the channel is already formed. Consequently, the power transistor M1 is turned on when power is initially turned on. The capacitor $C_{out}$ is charged by the AC line voltage close to the threshold voltage of the power transistor M1. A bandgap reference (BGR) generator (not shown) supplies a reference voltage $V_{ref}$ to the comparators C1 and C2.

The comparator C1 receives a signal $V_{ac\_sense}$ that provides an indication of the AC line voltage $V_{AC}$. The signal $V_{ac\_sense}$ is generated using a resistor divider comprising the resistors R1 and R2. Specifically, $V_{ac\_sense}=V_{AC}*R2/(R1+R2)$. When $V_{AC}$ is greater than $V_{ac\_sense}$, the transistor M2 turns on and pulls the gate voltage of the power transistor M1 to ground to turn off the power transistor M1. In the above example, the comparator C1 turns off the power transistor M1 when $V_{AC}$ is greater than or equal to 6V RMS. The value of $V_{AC}$ at which to turn off the power transistor M1 (e.g., 6V RMS) can be set to any value (e.g., 7V RMS, 8V RMS, 9V RMS, and so on) by selecting values of the resistors R1 and R2.

The comparator C2 receives a signal $V_{out\_sense}$ that provides an indication of the output voltage $V_{out}$. The signal $V_{out\_sense}$ is generated using a resistor divider comprising the resistors R3 and R4. Specifically, $V_{out\_sense}=V_{out}*R4/(R3+R4)$. When the output voltage $V_{out}$ is greater than $V_{out\_sense}$, the transistor M3 turns on and pulls the gate voltage of the power transistor M1 to ground to turn off the power transistor M1. In the above example, the comparator C2 turns off the power transistor M1 and stops charging the capacitor $C_{out}$ when the output voltage $V_{out}$ reaches 5V. The output voltage $V_{out}$ is therefore limited to 5V and cannot exceed 5V.

Accordingly, in this example, the comparator C1 turns on the power transistor M1 and allows charging of the capacitor $C_{out}$ when $V_{AC}$ is less than 6V RMS and $V_{out}$ is less than 5V, and turns off the power transistor M1 and stops charging the capacitor $C_{out}$ when $V_{AC}$ is greater than or equal to 6V RMS. The comparator C2 allows the comparator C1 to turn on the power transistor M1 when $V_{AC}$ is less than 6V RMS and allows charging of the capacitor $C_{out}$ when $V_{out}$ is less than 5V, and turns off the power transistor M1 and stops charging the capacitor $C_{out}$ when $V_{out}$ is equal to 5V.

The disable (DIS) input of the startup circuit 202 is an optional control that can be used by an independent application-specific controller to turn off the start-up circuit 202 to save power. For example, when the DIS pin is pulled up, the transistor M4 turns on and pulls the gate voltage of the power transistor M1 to ground to turn off the power transistor M1. The transistor M4 turns off the power transistor M1 regardless of the states of the transistors M2 and M3 determined by the comparators C1 and C2. Alternatively, the power transistor M1 can also be turned off by applying a voltage greater than $V_{out}$ at the $V_{out}$ pin. The voltage greater than $V_{out}$ may be generated by a power supply (e.g., the DC-to-DC converter 206).

In FIG. 4B, when power is turned on, the AC line voltage $V_{AC}$ (or the output voltage $V_{rect}$ of the rectifier 204) increases from zero. At time t1, $V_{AC}$ increases from zero to 5.1V RMS, for example. The power transistor M1 is turned on at time t1. At time t2, $V_{AC}$ increases from 5.1V RMS to 6V RMS, for example. The power transistor M1 is turned on until time t2 and turned off at time t2. Subsequently, $V_{AC}$ increases to a peak value of $V_{AC}$ and starts to decrease. At time t3, $V_{AC}$ decreases from the peak value to 6V, for example. The power transistor M1 is turned on at time t3. At time t4, $V_{AC}$ decreases from 6V to 5.1V, for example. The power transistor M1 is turned on until time t4 and turned off at time t4. Subsequently, $V_{AC}$ decreases to 0V, and the cycle repeats at the line frequency of the AC line voltage $V_{AC}$.

A drain current $I_{drain}$ flows through the power transistor M1 and charges the capacitor $C_{out}$ to the output voltage $V_{out}$ from time t1 to t2 and from time t3 to t4. The output voltage $V_{out}$ increases from time t1 to t2 and from time t3 to t4. The power transistor M1 is turned off and does not charge the capacitor $C_{out}$ at other times during the half cycle. The capacitor $C_{out}$ discharges from time t2 to t3 and from time t4 to t1. The output voltage $V_{out}$ therefore decreases from time t2 to t3 and from time t4 to t1.

Figure 5:
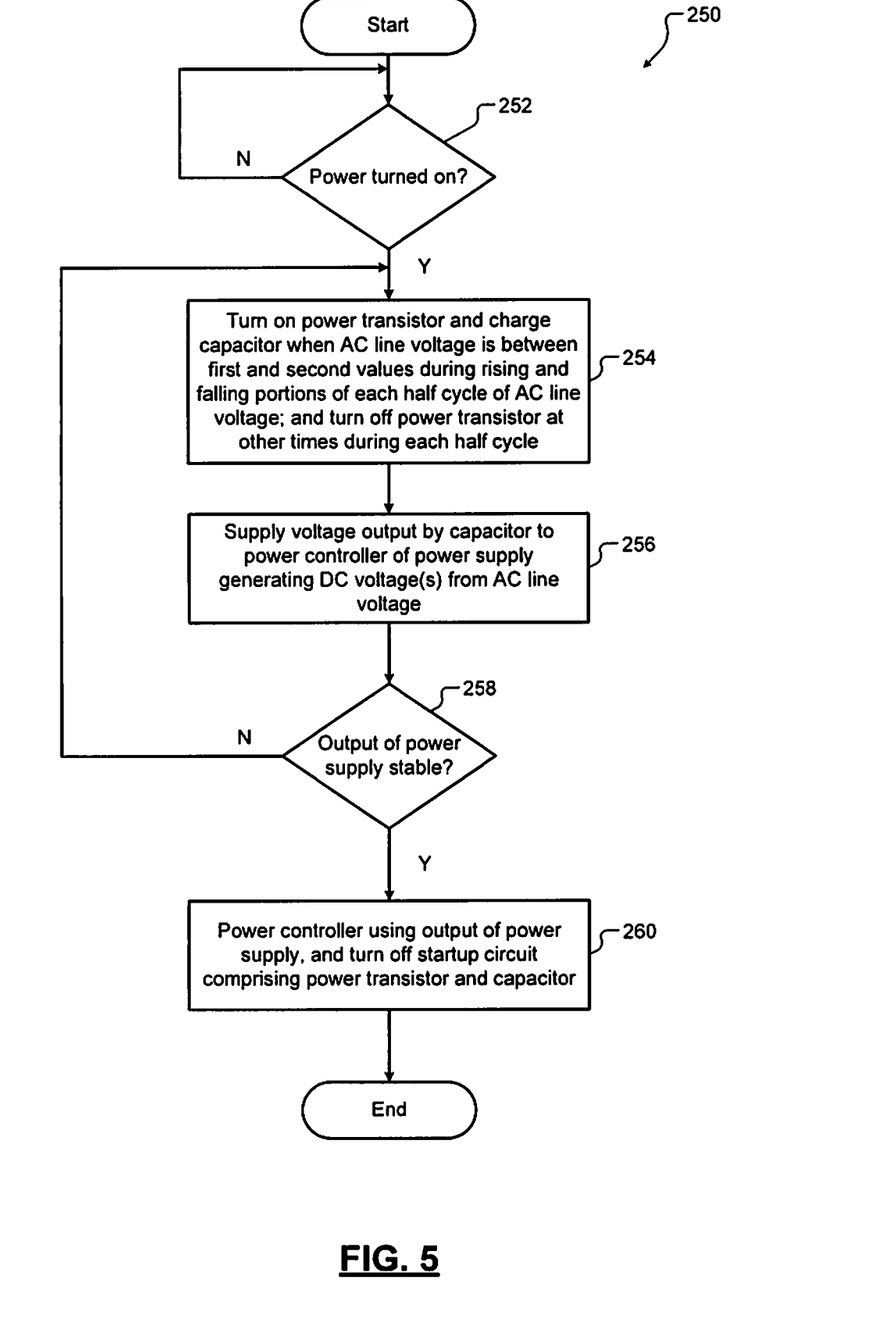
FIG. 5 is a flowchart of a method for powering a controller of a power supply at startup (i.e., when power is turned on).

Referring now to FIG. 5, a method 250 for powering a controller of a power supply at startup (i.e., when power is turned on) is shown. At 252, control determines if power to a power supply (e.g., AC line voltage) is turned on and waits until power is turned on. At 254, when power is turned on, control turns on a power transistor and charges a capacitor when the AC line voltage is between a first value and a second value during rising and falling portions of each half-cycle of the AC line voltage. Control turns off the power transistor at other times during each half-cycle. Control also turns the power transistor on and off based on whether the output voltage of the capacitor is less than or equal to a desired voltage (e.g., 5V DC). At 256, control uses the voltage output by the capacitor to power the controller of the power supply. Accordingly, the power supply can generate one or more DC voltages from the AC line voltage.

At 258, control determines if the output of the power supply is stable. Control returns to 254 if the output of the power supply is not yet stable. At 260, if the output of the power supply is stable, control uses the output of the power supply to power the controller and turns of the startup circuit comprising the power transistor and the capacitor.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

What is claimed is:

1. A system comprising:
    a power transistor configured to receive an alternating current (AC) line voltage; and
    a control circuit configured to
        during a rising portion of a half cycle of the AC line voltage, turn on the power transistor when the AC line voltage reaches a first value and turn off the power transistor when the AC line voltage reaches a second value, wherein the second value is greater than the first value, and
        during a falling portion of the half cycle, turn on the power transistor when the AC line voltage reaches the second value and turn off the power transistor when the AC line voltage reaches the first value.

2. The system of claim 1, further comprising a capacitance, wherein the power transistor charges the capacitance when the power transistor is turned on, and wherein the capacitance outputs a voltage having a value less than the first value.

3. The system of claim 2, wherein the control circuit is configured to turn off the power transistor when the voltage output by the capacitance is greater than or equal to the first value.

4. The system of claim 2 further comprising:
    a power supply configured to generate a direct current (DC) voltage based on the AC line voltage; and
    a controller configured to control the power supply,
    wherein the voltage output by the capacitance powers the controller.

5. The system of claim 4, wherein the control circuit is configured to disable the power transistor.

6. A system comprising:
    a power transistor configured to receive an alternating current (AC) line voltage and charge a capacitance to an output voltage based on when the power transistor is turned on during a half cycle of the AC line voltage; and
    a control circuit configured to
        turn on the power transistor to charge the capacitance when the AC line voltage is between a first value and a second value during a half cycle of the AC line voltage, wherein the first value is greater than or equal to the output voltage, and wherein the second value is greater than the first value by a predetermined amount, and
        turn off the power transistor when the AC line voltage is not between the first value and the second value during the half cycle of the AC line voltage or when the capacitance is charged to the output voltage.

7. The system of claim 6, further comprising:
    a controller configured to control a power supply,
    wherein the power supply generates a direct current (DC) voltage based on the AC line voltage, and
    wherein the capacitance outputs the output voltage to the controller.

8. The system of claim 7, wherein the control circuit is configured to turn off the power transistor and components of the control circuit.

9. The system of claim 6, wherein the control circuit comprises:
    a voltage divider configured to divide the AC line voltage;
    a comparator configured to compare an output of the voltage divider to a reference voltage; and
    a switch configured to, based on the comparison, turn on the power transistor when the AC line voltage is between the first value and the second value, and to turn off the power transistor when the AC line voltage is not between the first value and the second value.

10. The system of claim 6, wherein the control circuit comprises:
    a voltage divider configured to divide the output voltage;
    a comparator configured to compare an output of the voltage divider to a reference voltage; and
    a switch configured to, based on the comparison, turn on the power transistor when the AC line voltage is between the first value and the second value and when the capacitance is charged to less than the output voltage, and to turn off the power transistor when the capacitance is charged to greater than or equal to the output voltage.

11. An integrated circuit (IC), comprising:
    a first resistance having a first end connected to an alternating current (AC) line voltage, and a second end;

a second resistance having a first end connected to the second end of the first resistance, and a second end;

a first comparator having a first input connected to the second end of the first resistance, a second input connected to a reference voltage, and a first output;

a first transistor having a gate connected to the first output of the first comparator, a source connected to the second end of the second resistance, and a drain;

a second transistor having a source connected to the second end of the second resistance, a drain connected to the drain of the first transistor, and a gate;

a second comparator having a second output connected to the gate of the second transistor, a first input connected to the reference voltage, and a second input;

a third resistance having a first end connected to the second end of the second resistance and a second end connected to the second input of the second comparator;

a fourth resistance having a first end connected to the second input of the second comparator and a second end;

a fifth resistance having a first end connected to the second end of the fourth resistance and a second end connected to the drain of the first transistor;

a diode having a cathode connected to the first end of the fifth resistance and an anode;

a third transistor having a source connected to the anode of the diode, a drain connected to the first end of the first resistance, and a control terminal connected to the drain of the second transistor; and a capacitance having a first end connected to the cathode of the diode and a second end connected to the second end of the second resistance.

12. The IC of claim 11, further comprising:

a fourth transistor having a drain connected to the drain of the first transistor, a source connected to the second end of the second resistance, and a gate, wherein the fourth transistor turns off the third transistor irrespective of states of the first and second transistors when the gate of the fourth transistor is pulled up.

13. A method comprising:

supplying an alternating current (AC) line voltage to a power transistor;

during a rising portion of a half cycle of the AC line voltage, turning on the power transistor when the AC line voltage reaches a first value and turning off the power transistor when the AC line voltage reaches a second value, wherein the second value is greater than the first value; and during a falling portion of the half cycle, turning on the power transistor when the AC line voltage reaches the second value and turning off the power transistor when the AC line voltage reaches the first value.

14. The method of claim 13, further comprising:

charging a capacitance when the power transistor is turned on; and outputting a voltage having a value less than the first value.

15. The method of claim 14, further comprising turning off the power transistor when the voltage output by the capacitance is greater than or equal to the first value.

16. The method of claim 14, further comprising:

generating a direct current (DC) voltage based on the AC line voltage using a power supply; and powering, using the voltage output by the capacitance, a controller configured to control the power supply.

17. A method comprising:

supplying an alternating current (AC) line voltage to a power transistor;

charging a capacitance to an output voltage based on when the power transistor is turned on during a half cycle of the AC line voltage;

turning on the power transistor to charge the capacitance when the AC line voltage is between a first value and a second value during a half cycle of the AC line voltage, wherein the first value is greater than or equal to the output voltage, and wherein the second value is greater than the first value by a predetermined amount; and turning off the power transistor when the AC line voltage is not between the first value and the second value during the half cycle of the AC line voltage or when the capacitance is charged to the output voltage.

18. The method of claim 17, further comprising controlling, based on the output voltage, a power supply configured to supply generates a direct current (DC) voltage based on the AC line voltage.

19. The method of claim 17, further comprising:

dividing the AC line voltage using a voltage divider;

comparing an output of the voltage divider to a reference voltage; and based on the comparison, turning on the power transistor when the AC line voltage is between the first value and the second value, and turning off the power transistor when the AC line voltage is not between the first value and the second value.

20. The method of claim 17, further comprising:

dividing the AC line voltage using a voltage divider;

comparing an output of the voltage divider to a reference voltage; and based on the comparison, turning on the power transistor when the AC line voltage is between the first value and the second value and when the capacitance is charged to less than the output voltage, and turning off the power transistor when the capacitance is charged to greater than or equal to the output voltage.

* * * * *